United States Patent
Frey et al.

(10) Patent No.: US 8,572,972 B2
(45) Date of Patent: Nov. 5, 2013

(54) SYSTEM AND METHOD FOR SECONDARY ENERGY PRODUCTION IN A COMPRESSED AIR ENERGY STORAGE SYSTEM

(75) Inventors: Thomas Johannes Frey, Regensburg (DE); Matthias Finkenrath, Garching b. Muenchen (DE); Gabor Ast, Garching (DE); Stephanie Marie-Noelle Hoffmann, Munich (DE); Matthew Lehar, Munich (DE); Richard Aumann, Munich (DE)

(73) Assignee: General Electric Company, Niskayuna, NY (US)

( * ) Notice: Subject to any disclaimer, the term of this patent is extended or adjusted under 35 U.S.C. 154(b) by 714 days.

(21) Appl. No.: 12/617,812

(22) Filed: Nov. 13, 2009

(65) Prior Publication Data
US 2011/0113781 A1     May 19, 2011

(51) Int. Cl.
| | |
|---|---|
| *F01K 1/00* | (2006.01) |
| *F01K 13/02* | (2006.01) |
| *F01K 23/04* | (2006.01) |
| *F01K 13/00* | (2006.01) |
| *F03G 6/00* | (2006.01) |
| *F03G 7/00* | (2006.01) |

(52) U.S. Cl.
USPC ......... 60/659; 60/641.14; 60/641.15; 60/652; 60/655; 60/676

(58) Field of Classification Search
USPC .................... 60/659, 652, 676, 412, 456, 327
See application file for complete search history.

(56) References Cited

U.S. PATENT DOCUMENTS

| | | | |
|---|---|---|---|
| 3,677,008 A | 7/1972 | Koutz | |
| 4,150,547 A * | 4/1979 | Hobson | 60/659 |
| 4,523,432 A * | 6/1985 | Frutschi | 60/659 |
| 4,765,142 A * | 8/1988 | Nakhamkin | 60/652 |
| 4,942,736 A * | 7/1990 | Bronicki | 60/641.12 |
| 5,317,904 A * | 6/1994 | Bronicki | 62/87 |
| 5,448,889 A * | 9/1995 | Bronicki | 60/641.14 |
| 5,537,822 A | 7/1996 | Shnaid et al. | |
| 5,634,340 A | 6/1997 | Grennan | |
| 2009/0000299 A1 | 1/2009 | Ast et al. | |
| 2009/0145103 A1 | 6/2009 | Nakhamkin | |
| 2009/0179429 A1 * | 7/2009 | Ellis et al. | 290/1 R |

OTHER PUBLICATIONS

A Preliminary Study of the Kalina Power Cycle in Connection with a Combined Cycle System, Park et al, International Journal of Energy Research vol. 14, 153-162 (1990).*

* cited by examiner

*Primary Examiner* — Kenneth Bomberg
*Assistant Examiner* — Deming Wan
(74) *Attorney, Agent, or Firm* — Andrew J. Caruso (57) ABSTRACT

A method, system, and apparatus including a compressed air energy storage (CAES) system including a compression train with a compressor path, a storage volume configured to store compressed air, a compressed air path configured to provide passage of compressed air egressing from the compression train to the storage volume, and a heat recovery system coupled to at least one of the compressor path and the compressed air path and configured to draw heat from at least one of the compressor path and the compressed air path to a first liquid. The compression train is configured to provide passage of compressed air from a first compressor to a second compressor. The heat recovery system includes a first evaporator configured to evaporate the first liquid to a first gas and a first generator configured to produce electricity based on an expansion of the first gas.

14 Claims, 5 Drawing Sheets

SYSTEM AND METHOD FOR SECONDARY ENERGY PRODUCTION IN A COMPRESSED AIR ENERGY STORAGE SYSTEM

BACKGROUND OF THE INVENTION

Embodiments of the invention relate generally to compressed air energy storage (CAES) systems and, more particularly, to secondary energy production via a CAES system.

CAES systems typically include a compression train having a plurality of compressors that compress intake air and provide the compressed air to a cavern or other compressed air storage volume. The compressed air is then later used to drive turbines to produce energy such as electrical energy. Often, if utility energy is used to power the compression train, the compression train operates during off-peak hours of utility plants while the energy production or generation stage of the CAES system typically operates during high energy demand times. However, this need not be the case in every instance. For example, energy generated from wind mills may be used to power the compression train while compressed air is delivered to the energy storage cavern or the like. In any event, the economics of the CAES system energy consumption versus CAES system energy production is typically a driving factor determining when the compression stage and the production stage operate.

During operation of the compression stage of a CAES system, the compressed air is typically cooled to cavern temperature, or at least close to cavern temperature, prior to storage. Generally, during the energy production stage of a CAES system, compressed air stored in the cavern is removed and heated. After heating, the compressed air is allowed to expand through one or more turbines, thus causing the turbine(s) to drive one or more generators to produce electricity. Effectively, the volume and pressure changes of the compressed air are utilized to produce electricity. Typically, however, other forms of energy transferred with the compressed air are not tapped to produce electricity therefrom. As such, CAES energy production may not be maximized.

Accordingly, it would be beneficial to have a method and system of maximizing energy production of a CAES system.

BRIEF DESCRIPTION OF THE INVENTION

Embodiments of the invention are directed to a method, system, and apparatus for maximizing energy production in a CAES system.

In accordance with one aspect of the invention, a compressed air energy storage (CAES) system includes a compression train, a storage volume configured to store compressed air egressing from the compression train, a compressed air path coupled to the compression train and the storage volume, and a heat recovery system. The compression train includes a first compressor configured to compress air, a second compressor configured to further compress air, and a compressor path configured to provide passage of compressed air from the first compressor to the second compressor. The compressed air path is configured to provide passage of compressed air egressing from the compression train to the storage volume. The heat recovery system is coupled to at least one of the compressor path and the compressed air path and is configured to draw heat from at least one of the compressor path and the compressed air path to a first liquid. The heat recovery system includes a first evaporator configured to evaporate the first liquid to a first gas and a first generator configured to produce electricity based on an expansion of the first gas.

In accordance with another aspect of the invention, a compressed air energy storage (CAES) system includes a compressed air storage volume, a compression train coupled to the compressed air storage volume, a compressed air storage path coupled to the compression train, a primary generator configured to generate electricity based on expansion of compressed air passed from the compressed air storage volume, and a secondary electrical generation system coupled to the compression train. The compression train includes a plurality of compressors in series configured to serially compress ambient air passing therethrough and a compressor path configured to provide passage of air from a first compressor of the plurality of compressors to a last compressor of the plurality of compressors. The compressed air storage path is configured to allow passage of the ambient air compressed by the plurality of compressors to the compressed air storage volume. The secondary electrical generation system includes a first liquid configured to receive a first quantity of heat extracted from compressed air passing through at least one of the compressor path and the compressed air storage path, a first evaporator configured to convey the first quantity of heat to the first liquid and cause the first liquid to evaporate to a first gas, and a first secondary generator configured to generate electricity based on expansion of the first gas.

In accordance with yet another aspect of the invention, a method of producing energy from a compressed air energy storage (CAES) system that includes conveying a quantity of air through a compression system having an air intake to intake the quantity of air into the compression system, at least two compressors in series configured to compress the quantity air after intake, a compressor path from the first compressor to the second compressor, and a compressed air path configured to provide a path for the quantity of air that is compressed to exit the compression system into a compressed air storage volume. The method further includes generating primary electricity based on expansion of compressed air passed from the compressed air storage volume, transferring a first quantity of heat from the quantity of air passing through one of the compressor path and the compressed air path to a first liquid to aid in an evaporation of the first liquid to a first gas, and generating electricity based on expansion of the first gas through a turbine.

Various other features and advantages will be made apparent from the following detailed description and the drawings.

BRIEF DESCRIPTION OF THE DRAWINGS

The drawings illustrate one or more embodiments presently contemplated for carrying out the invention.

In the drawings.

DETAILED DESCRIPTION

Embodiments of the invention relate to adiabatic and non-adiabatic CAES systems.

Figure 1:
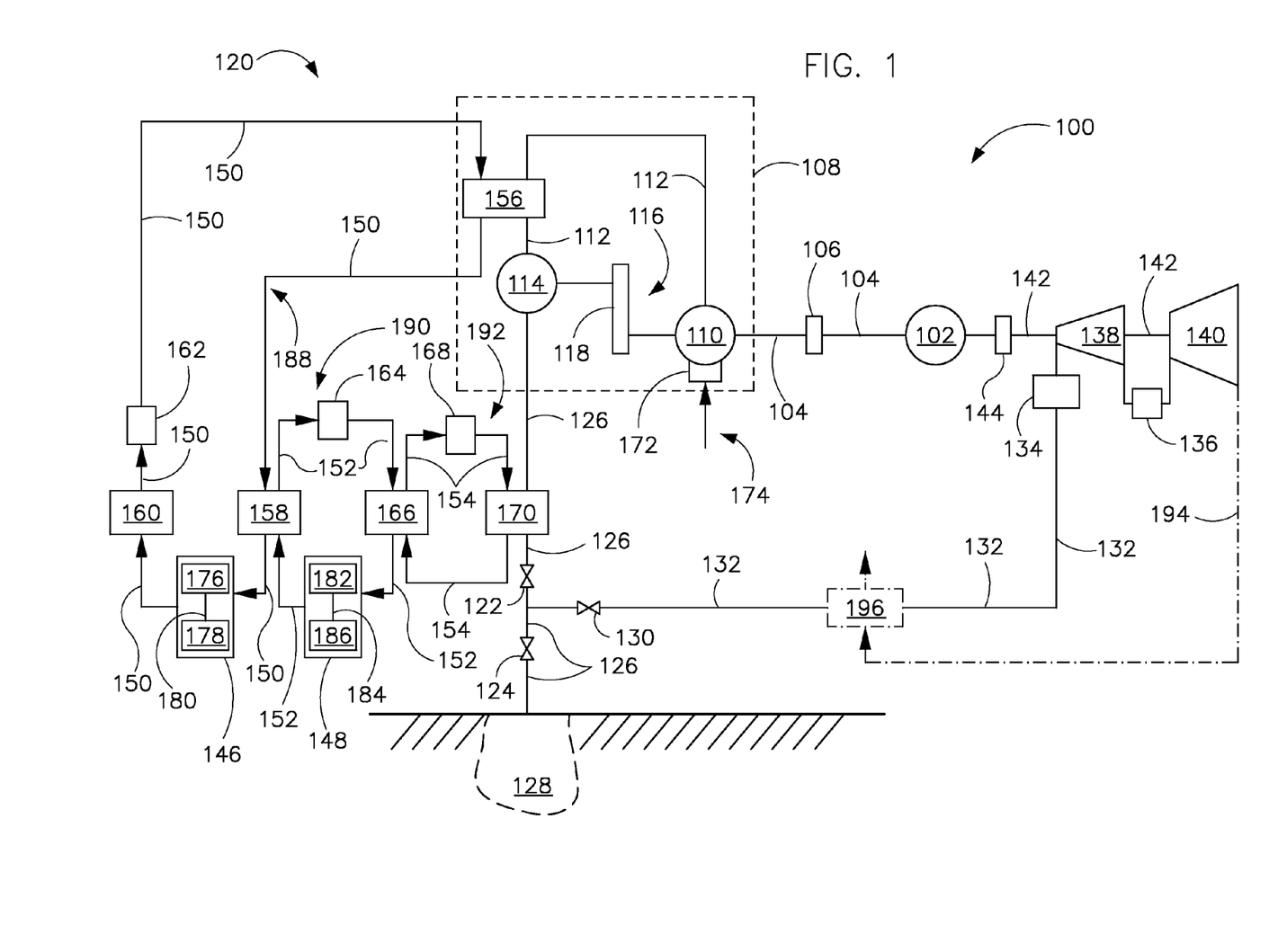
FIG. 1 is a block diagram of an exemplary CAES system having a secondary energy production system according to an embodiment of the invention.

Referring to FIG. 1, a CAES system 100 is shown according to embodiments of the invention. CAES system 100 includes a motor/generator 102 and a drive shaft system 104, which has a clutch 106, and proceeds from motor/generator 102 to a compression train 108. Compression train 108 includes a first compressor 110, a compressor path 112, a second compressor 114, and a compressor drive shaft system 116 that includes a first gear box 118. CAES system 100 also includes a secondary energy or electrical production system 120, a first valve 122 and a second valve 124 along a compressed air path 126, and a storage volume 128.

Along a primary energy production stage, CAES system 100 includes a third valve 130 along a compressed air exit path 132, a first heating unit 134, and a second heating unit 136. A primary energy production system includes a first expander 138, a second expander 140, an expander drive shaft system 142, and second clutch 144 along expander drive shaft system 142.

Secondary energy production system 120 includes a first energy electrical production unit 146 and a second secondary energy or electrical production unit 148. Secondary energy production system 120 also includes a first heat transfer path 150, a second heat transfer path 152, and a third heat transfer path 154. Along first heat transfer path 150 lies an intercooler 156, an evaporator/condenser 158, first secondary energy production unit 146, a first condenser 160, and a first pump 162. Along second heat transfer path lies a second pump 164, an evaporator 166, second secondary energy production unit 148, and evaporator/condenser 158. Along third heat transfer path 154 lies a third pump 168, an aftercooler 170, and evaporator 166.

During a compression stage, second clutch 144 is disengaged, and first clutch 106 is engaged. Motor/generator 102 then drives compression train 108 and compressor drive shaft system 116 via drive shaft 104. Compression train 108 includes an ambient air intake 172, which during operation of compression train 108, intakes ambient air 174 that is drawn to first air compressor 110. Accordingly, first compressor 110 compresses air flowing therethrough. Generally, the temperature of the air rises during compression. As such, air egressing from first compressor 110 along compressor path 112 is cooled by intercooler 156 before the compressed air is further compressed by second compressor 114. Again, compression tends to cause the air temperature to rise. As such, aftercooler 170 along compressed air path 126 is employed to cool the compressed air egressing from second compressor 114. By removing heat from the compressed air prior to storage, the integrity of storage volume 128 maintained. Though only two compressors are shown, it is contemplated that embodiments of the invention may include additional compressors (not shown) along compressor path 114.

It is noted that, during the compression stage, first and second valves 122, 124 are manipulated to allow compressed air to flow to storage volume 128 while third valve 130 is manipulated so that compressed air does not flow to first and second expanders 138, 140. During the primary energy production stage, first, second, and third valves 122, 124, 130 are manipulated such that compressed air form storage volume 128 is passed along compressed air exit path 132 to first and second expanders 138, 140, causing motor/generator 102 to produce electrical energy. As such, during the primary energy production stage, energy is produced from the compressed air stored in storage volume 128.

Secondary energy production system 120, on the other hand, serves as a heat recovery system and is configured to produce energy from heat extracted from the compressed air during the compression stage. For example, heat extracted from compressor path 112 via intercooler 156 is conveyed to first heat transfer path 150. It is contemplated that first heat transfer path 150 includes a low-temperature fluid including, for example, a refrigerant or butane-type fluid. The heat conveyed to first heat transfer path 150 via intercooler 156 proceeds to evaporator/condenser 158, where additional heat is transferred to first heat transfer path 150. The additional heat added to first heat transfer path 150 via evaporator/condenser 158 causes fluid in first heat transfer path 150 to evaporate to a gas. The gas is allowed to pass through first secondary energy production unit 146 and electrical energy is produced therefrom. It is contemplated that first secondary energy production unit 146 includes a first secondary expander 176, such as a turbine, coupled to a first secondary generator 178 via a first secondary generator drive shaft 180. In such an embodiment, the gas passing from evaporator/condenser 158 is allowed to pass through first secondary expander or turbine 176. Accordingly, the gas causes turbine 176 to rotate, which in turn causes first secondary generator drive shaft to drive first secondary generator 178 to produce electricity.

As discussed above, additional heat is transferred to first heat transfer path 150 via evaporator/condenser 158. The heat transferred via evaporator/condenser 158 to first heat transfer path 150 can be traced back to the compressed air in compressed air path 126. As discussed above, air generally increases in temperature as it is compressed. As such, as ambient air 174 is compressed by first compressor 110, the compressed air flowing from first compressor 110 is warmer than ambient air 174 entering first compressor 110. Likewise, the compressed air leaving second compressor 114 is generally warmer than the compressed air entering second compressor 114. Heat from the compressed air leaving second compressor 114 is conveyed via aftercooler 170 along compressed air path 126 to third heat transfer path 154. It is contemplated that third heat transfer path 154 include a thermal oil. As such, according to one embodiment, heat is transferred from the compressed air to the thermal oil of third heat transfer path 154. The thermal oil is then allowed to pass over or through evaporator 166, where heat from the thermal oil is conveyed to a second heat transfer path 152.

It is contemplated that second heat transfer path 152 includes a high-temperature liquid (e.g., a pentane-type liquid). The heat conveyed to the liquid of second heat transfer path 152 causes the liquid to evaporate to a gas. This gas is conveyed to second secondary energy production unit 148. It is contemplated that second secondary energy production unit 148 includes a second secondary expander 182, a second secondary drive shaft 184, and a second secondary generator 186. In such an embodiment, the gas is allowed to pass or expand through second secondary expander 182 (e.g., a turbine), causing second secondary expander 182 to drive second secondary drive shaft 184, which is turn drives second secondary generator 186, thus producing electricity therefrom. Generally, the evaporated liquid or gas cools after passing through secondary energy production unit 148. However, residual heat left in the gas after passing through second secondary energy production unit 148 is transferred to first heat transfer path 150 via evaporator/condenser 158. In turn, the gas of second heat transfer path 152 condenses to a liquid as it passes through evaporator/condenser 158. The liquid is then pumped, via second pump 164, back through evaporator 166.

Accordingly, heat transferred to first heat transfer path 150 can be traced back to compressed air path 126 and compressor path 112.

It is noted that, due to the thermal dynamic characteristics of third heat transfer path 154, some of the conveyed heat is dissipated to the environment. Accordingly, heat transferred to second heat transfer path 152 via evaporator 166 is reduced, thus eliminating or at least minimizing an excessive pressure build up in second heat transfer path 152. As will be shown with respect to FIG. 2, an alternate embodiment not utilizing third heat transfer path 154 of FIG. 1 and evaporator 166 is contemplated.

It is noted that the heat transfer cycles discussed above are generally referred to as Rankine or organic Rankine cycles. As shown in FIG. 1, two organic Rankine cycles are depicted: a first Rankine cycle 188 along first heat transfer path 150 and a second Rankine cycle 190 along second heat transfer path 152. A third cycle 192 along third heat transfer path 154 is a heat transfer cycle without power generation and without fluid phase change.

Still referring to FIG. 1, during a primary energy production stage, first clutch 106 is disengaged and second clutch 144 is engaged. Further, as discussed above, third valve 130 is manipulated to allow compressed air stored in storage volume 128 to pass along compressed air exit path 132 to first and second expanders 138, 140. Due to the compressed air passing through first and second expanders 138, 140, expanders 138, 140 cause expander drive shaft 142 to power motor/generator 102, thus producing energy therefrom. Though only two primary expanders 138, 140 are depicted, it is contemplated that additional primary expanders (not shown) may be employed.

Heating units 134, 136 of FIG. 1 are employed to reheat compressed air passing through compressed air exit path 132 to increase efficiency of the primary energy production. It is also noted that heating units 134, 136 also serve to protect first and second expanders 138, 140 from air that is too cold. For example, if the compressed air entering into first and/or second expanders 138, 140 via compressed air exit path 132 is not properly warmed, the low temperatures attained during the expansion of the compressed air may cause first and/or second expander 138, 140 to "freeze-up." Accordingly, first heating unit or burner 134 warms the compressed air entering into first expander 138 and second heating unit or burner 136 warms the partially expanded air entering second expander 140. As such, "freeze-up" conditions are avoided or at least minimized.

In an alternate embodiment, rather than, or in addition to, employing first and second heating units 134, 136, exhaust air from first and/or second expanders 138, 140 is passed through an exhaust path 194 (shown in phantom) over a heat exchanger 196 (shown in phantom). As such, heat from the exhaust air is transferred to compressed air within compressed air exit path 132, thus warming the compressed air.

Figure 2:
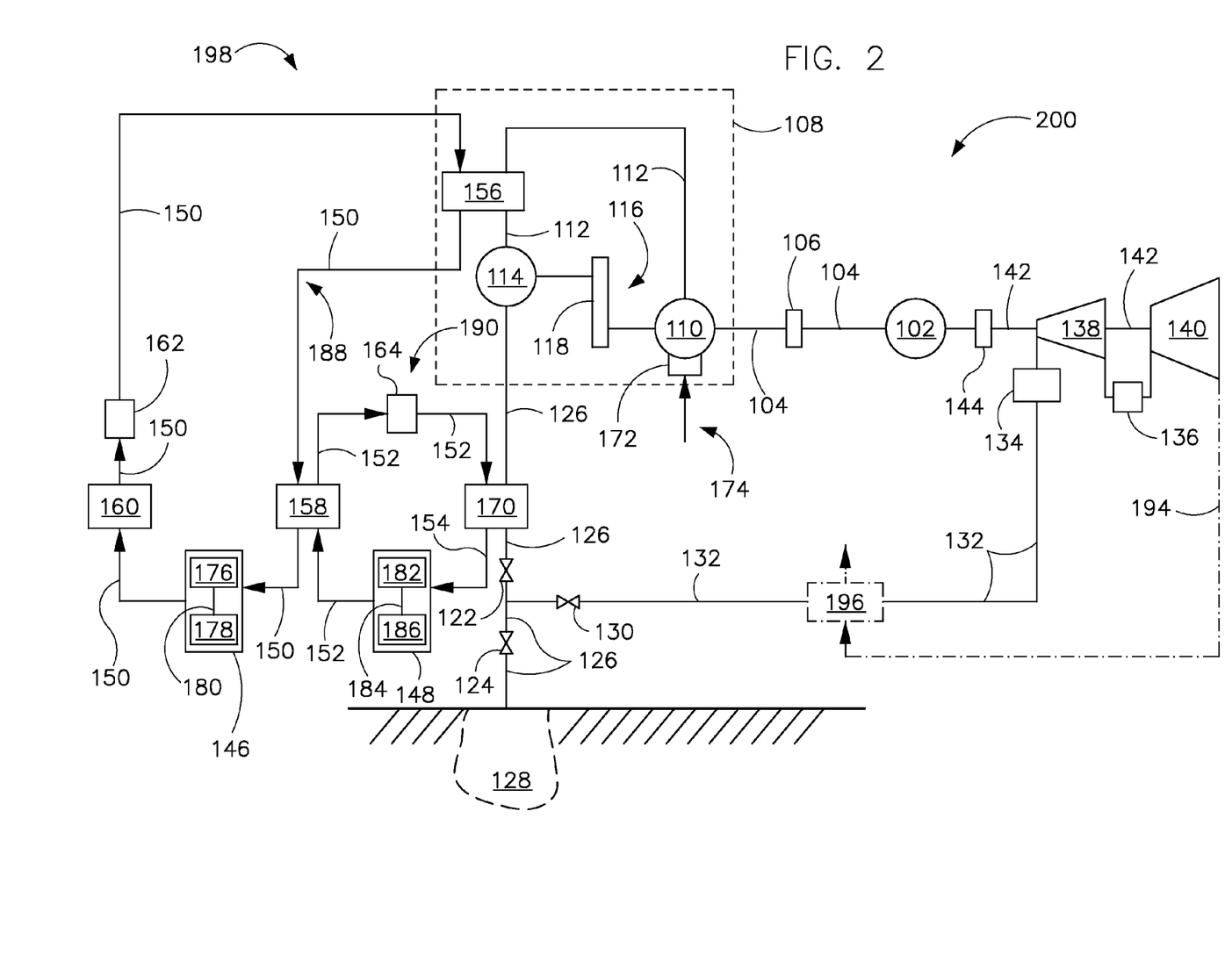
FIG. 2 is a block diagram of an exemplary CAES system having a secondary energy production system according to another embodiment of the invention.

Referring now to FIG. 2, a secondary energy or electrical production system 198 of a CAES system 200 is shown according to an another embodiment of the invention. Components similar to those included in secondary energy production system 120 of FIG. 1 are shown with common reference numerals.

In contrast to secondary energy production system 120, secondary energy production system or heat recovery system 198 of FIG. 2 does not include a third heat transfer path such as third heat transfer path 154 of FIG. 1 or evaporator 166. In other words, the embodiment of FIG. 1 does not include heat transfer cycle 192 of FIG. 2. Instead, heat is transferred from the compressed air in compressed air path 126 of FIG. 2 directly to second heat transfer path 152 via aftercooler 170. In such an embodiment, aftercooler 170, in addition to cooling the compressed air in compressed air path 126, causes a liquid in second heat transfer path 152 to evaporate to a gas. It is contemplated that aftercooler 170 is configured to ensure that the quantity of heat transferred to second heat transfer path 152 does not cause the liquid therein to reach excessive pressures or that the liquid in second heat transfer path 152 is configured to absorb the quantity of heat capable of being transferred thereto via aftercooler 170 without incurring excessive pressure build-up. Alternatively, both aftercooler 170 and the liquid in second heat transfer path 152 are configured to ensure that the liquid does not explode when heat is transferred thereto.

It is noted that, as with FIG. 1, it is contemplated that additional compressors (not shown) and primary expanders (not shown) may be employed with embodiments of FIG. 2.

Figure 3:
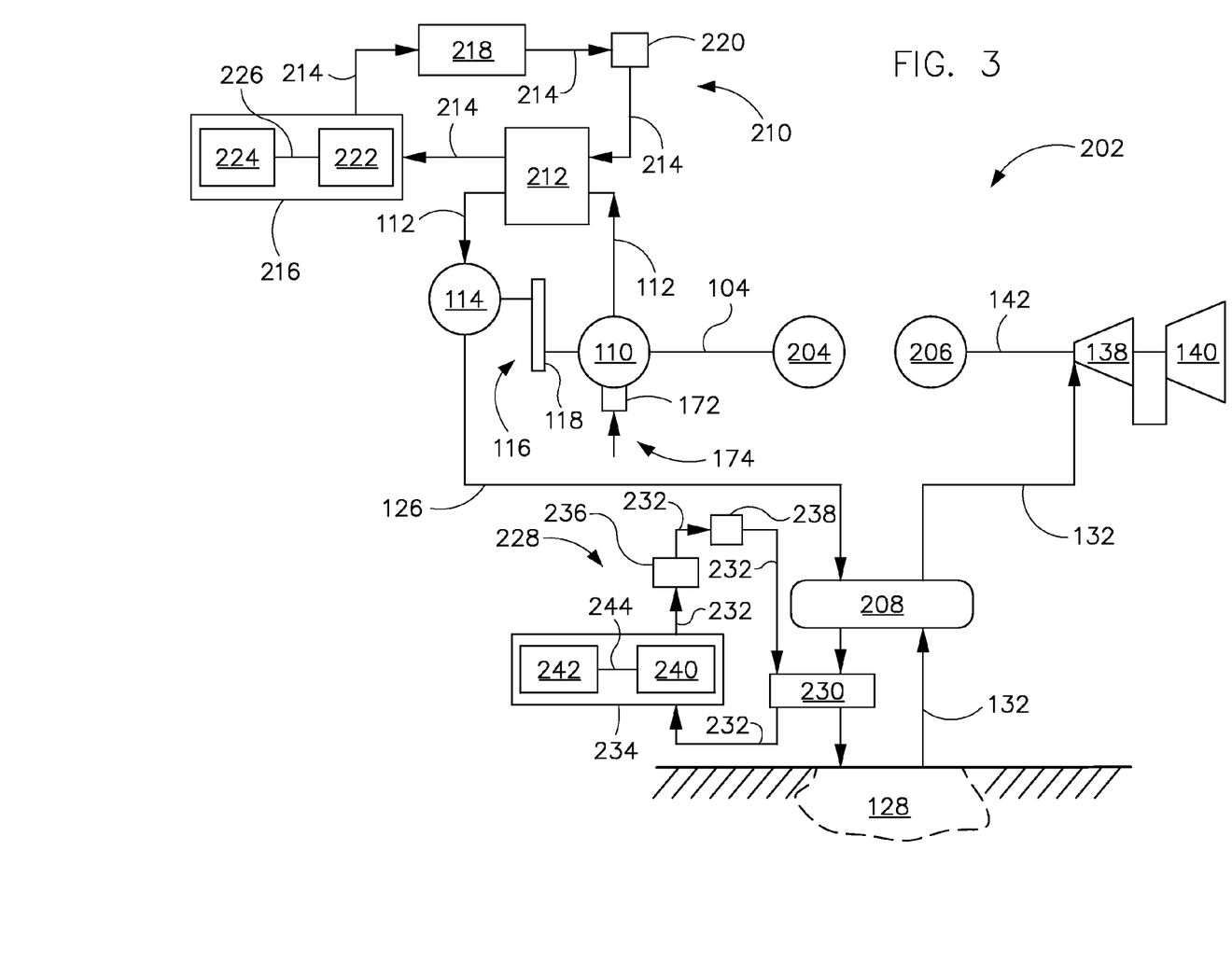
FIG. 3 is a block diagram of an exemplary adiabatic CAES system having multiple secondary energy production systems according to another embodiment of the invention.

Referring now to FIG. 3, an adiabatic CAES system 202 is shown according to a embodiments of the invention. Similar components among FIGS. 1, 2, and 3 are shown with common reference numerals. Rather than including a single motor/generator unit such as motor/generator 102 of FIGS. 1 and 2, embodiments of FIG. 3 include a motor 204 to generate power for compression and a separate generator 206 for energy production. It is contemplated that embodiments of FIG. 1 may function in a similar manner. Likewise, it is also contemplated that adiabatic system 202 may employ a motor/generator (not shown) such as motor/generator 102 of FIG. 1, rather than the combination of motor 204 and generator 206 shown in FIG. 3.

In further contrast to the embodiments depicted in FIGS. 1 and 2, adiabatic CAES system 202 of FIG. 3 includes a thermal energy storage (TES) system 208. TES system 208 is configured to remove and store heat from compressed air passing along compressed air path 126 to storage volume 128. Further, as the compressed air proceeds to compressed air exit path 132, TES system 208 is configured to transfer the stored heat back to the compressed air prior to the compressed air entering first and second expanders 138, 140. Accordingly, neither first and second burners 134, 136 of FIG. 1 nor heat exchanger 196 are employed.

According to an embodiment of the invention, adiabatic CAES system 202 of FIG. 3 includes a first energy or electrical production system 210 that includes a first heat exchanger 212, a first heat transfer path 214 having a liquid therein (not shown), a first secondary energy production unit 216, a first condenser 218, and a first pump 220. According to an embodiment of the invention, first heat exchanger or intercooler 212 cools compressed air leaving first compressor 110 along compressor path 112. The heat drawn from the compressed air is conveyed, via first heat exchanger 212, to the liquid within first heat transfer path 214. Accordingly, at least a portion of the liquid evaporates to a gas. The gas is then allowed to pass to first secondary energy production unit 216 to produce electricity therefrom. It is contemplated that first secondary energy production unit 216 includes at least one expander 222, such as a turbine, coupled to at least one generator 224 via a drive shaft 226. In such an embodiment, the gas causes expander 222 to power drive shaft 226, which in turn drives generator 224—thus producing energy. The gas exiting from first energy production unit 216 through first heat transfer path 214 is then passed through first condenser 218 and is condensed back to a liquid. The liquid is pumped, via first pump 220, back to first heat exchanger 212, and the cycle repeats.

In another embodiment, adiabatic CAES system 202 also includes a second energy production system 228 that includes a second heat exchanger 230, a second heat transfer path 232, a second secondary energy production unit 234, a second condenser 236, and a second pump 238. In such an embodiment, residual heat left in the compressed air after passing through TES system 208 to storage volume 128 is conveyed to second heat transfer path 232 via second heat exchanger 230. As such, at least a portion of a liquid passing along second heat transfer path 232 through or over second heat exchanger 230 is evaporated to a gas. The gas is then allowed to pass through second secondary energy production unit 234 and electricity is generated therefrom.

It is contemplated that second secondary energy production unit 234 include at least one expander 240 coupled to at least one generator 242 via a drive shaft 244. In such an embodiment, the gas passes through expander 240. Expander 240 then rotates drive shaft 244, which drives generator 242—thus producing energy therefrom. As shown in FIG. 3, two organic Rankine cycles are depicted. That is, first secondary energy production system 210 comprises a first organic Rankine cycle, and second secondary energy production system 228 comprises a second organic Rankine cycle. However, embodiments including only second organic Rankine cycle (i.e., second energy production system 228) are also envisioned.

It is noted that embodiments discussed with respect to FIG. 3 may employ additional compressors (not shown) and primary expanders (not shown).

Figure 4:
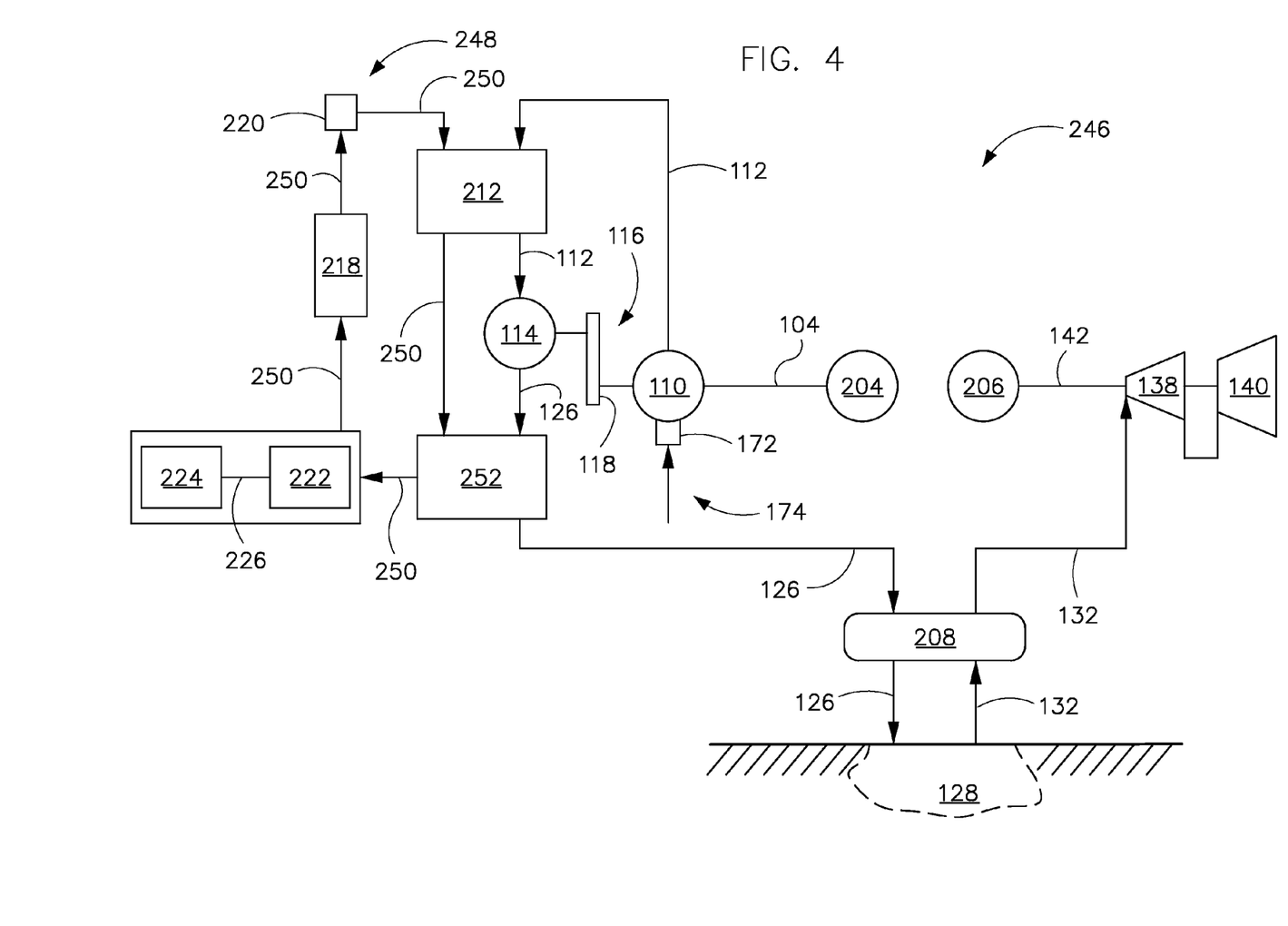
FIG. 4 is a block diagram of an exemplary adiabatic CAES system according to another embodiment of the invention.

Referring now to FIG. 4, an adiabatic CAES system 246 is shown according to another embodiment of the invention. In contrast to CAES system 202, a secondary energy or electrical production system 248 includes a first heat transfer path 250 that proceeds through intercooler 212 and an aftercooler 252. As such, first heat transfer path draws heat from compressed air passing through compressor path 212 and compressed air storage path 126. According to an alternate embodiment (not shown), it is contemplated that heat transfer path 250 may first proceed through heat exchanger 252 and then through intercooler 212, rather than first through intercooler 212 and then through heat exchanger 252. Further, according to yet another embodiment (not shown), heat exchanger 252 may be positioned along compressed air storage path 126 between TES 208 and storage volume 128 rather than the location depicted in FIG. 4. According to such an embodiment, heat transfer path 250 of secondary energy production system 248 would proceed through heat exchanger 252 located between TES 208 and storage volume 128.

It is also contemplated that secondary energy production system 248, which functions as an organic Rankine cycle, may include an intermediate loop (not shown) such as the thermal oil loop of FIG. 1 (i.e., third heat transfer path 154 of FIG. 1). In such an embodiment, an intermediate loop would collect heat from intercooler 212 and aftercooler 252 and pass such heat to the liquid of first heat transfer path 250, thus turning the liquid of first heat transfer path 250 to a gas. Since such an intermediate loop reduces heat transfer to first heat transfer path 250, such an intermediate loop may be employed when, for example, it is preferred that the quantity of heat being transferred to first heat transfer path 250 be reduced.

Figure 5:
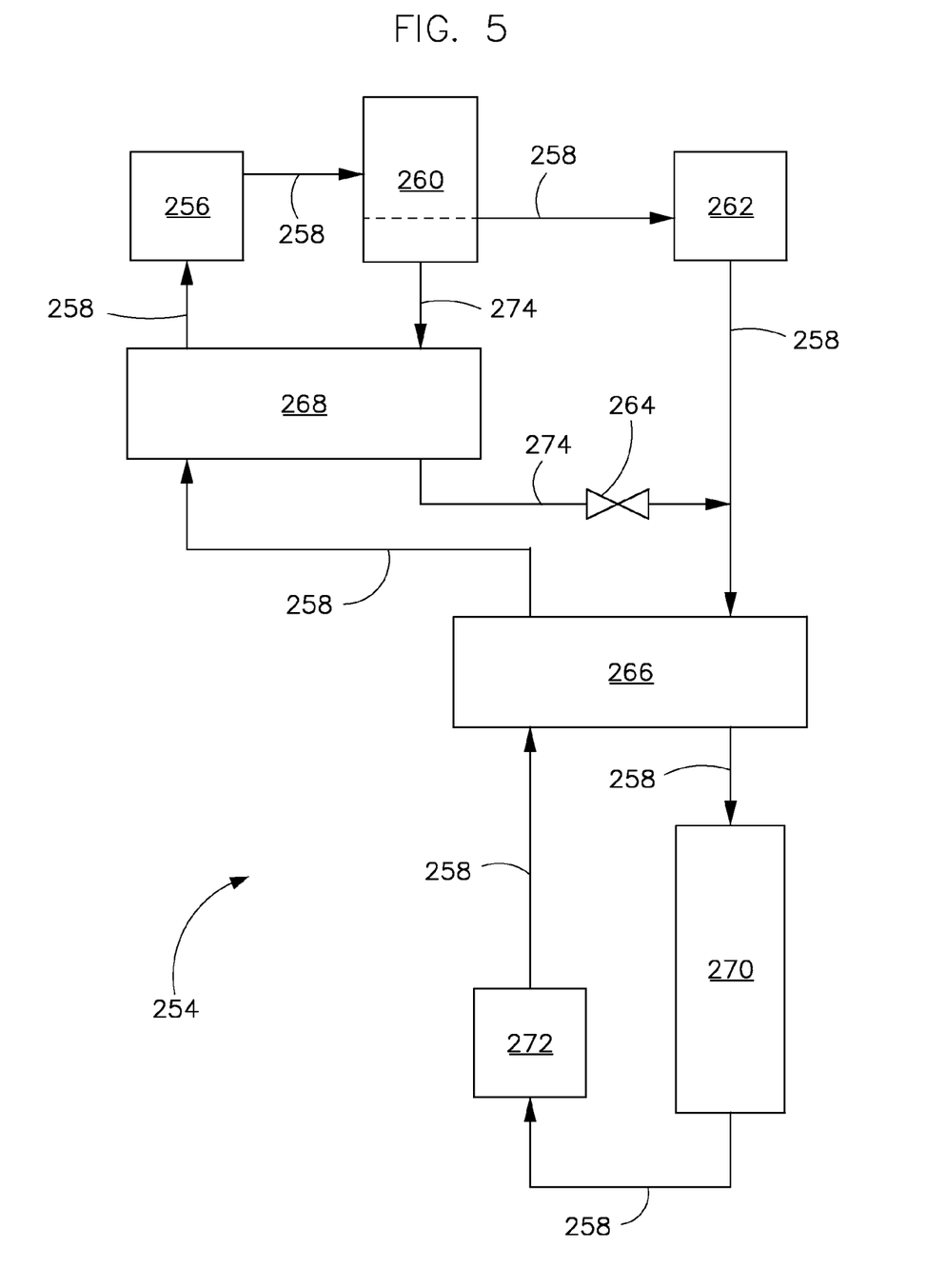
FIG. 5 is a block diagram of an exemplary Kalina cycle that may be implemented with embodiments of the invention.

As shown above with respect to FIGS. 1-4, embodiments of the invention produce secondary energy via secondary energy production systems 120, 198, 228, 248 that utilise one or more heat transfer cycles (e.g., 188-192, 210, 228, 248 of FIGS. 1-4). It is contemplated, however, that one or more Kalina cycles may be utilised, rather than Rankine or organic Rankine cycles. For example, referring now to FIG. 5, a Kalina cycle 254, which may be used with embodiments of the invention, is shown according to an embodiment of the invention. Kalina cycle 254 includes a heat exchanger 256, a Kalina heat transfer path 258, a separator 260, a first secondary energy production unit 262, a first valve 264, a second heat exchanger 266, a third heat exchanger 268, a first condenser 270, and a first pump 272. Heat exchanger 256 may, for example, serve as an intercooler and/or and aftercooler (e.g., intercoolers 156, 212 of FIGS. 1-3 and aftercoolers 170, 230, 252 of FIGS. 1-3). As such, heat is drawn from a compressor path (e.g., compressor path 112 of FIGS. 1-4) and/or a compressed air path (e.g., compressed air path 126 of FIGS. 1-3) via heat exchanger 256 of FIG. 5 and conveyed to Kalina heat transfer path 258, which includes a high-temperature liquid solution such as an ammonia/water liquid combination or mixture. As a result of heat being transferred to Kalina heat transfer path 258 via heat exchanger 256, a portion of the solution in Kalina heat transfer path 258 evaporates to a gas, thus producing a gas/liquid mixture. This mixture is passed through separator 260, which conveys the liquid portion of the solution down a bypass path 274 of Kalina heat transfer path 258, while allowing the evaporated or gaseous portion of the solution to pass to first secondary energy production unit 262. By allowing the gaseous solution to expand through first secondary energy production unit 262, energy is produced from first secondary energy production unit 262. The expanded gas is then conveyed along Kalina heat transfer path 258 where, upon first valve 264 moving to an open position, it mixes back with the liquid solution that passed along bypass path 274. The combined solution then passes through second heat exchanger 266 to first condenser 270, where the gaseous portion of the solution condenses back to a liquid. As such, the solution leaving first condenser 270 is substantially in a liquid form. The liquid solution is pumped, via pump 272, through second heat exchanger 266, where residual heat in the solution exiting from first secondary energy production unit 262 is conveyed to the liquid solution, which passes to third heat exchanger 268. Heat found in the liquid solution exiting separator 260 via bypass path 274 to third heat exchanger 268 is transferred, via third heat exchanger 268, to the liquid solution passing to first heat exchanger 256.

One or more Kalina cycles such as Kalina cycle 254 may be used in conjunction with or instead of the heat transfer cycles (e.g., heat transfer cycles 188-192 of FIGS. 1-2) of FIGS. 1-3 for secondary energy production. That is, one or more of organic Rankine cycles 188-190 or third heat transfer cycle 192 of FIGS. 1-2 may be replaced with a Kalina cycle such as Kalina cycle 254. Likewise, one or more of first and second organic Rankine cycles of FIG. 3 that include first and second secondary energy production systems 210, 228, respectively, may be replaced with a Kalina cycle such as Kalina cycle 254.

In accordance with one embodiment of the invention, a compressed air energy storage (CAES) system includes a compression train, a storage volume configured to store compressed air egressing from the compression train, a compressed air path coupled to the compression train and the storage volume, and a heat recovery system. The compression train includes a first compressor configured to compress air, a second compressor configured to further compress air, and a compressor path configured to provide passage of compressed air from the first compressor to the second compressor. The compressed air path is configured to provide passage of compressed air egressing from the compression train to the storage volume. The heat recovery system is coupled to at least one of the compressor path and the compressed air path and is configured to draw heat from at least one of the compressor path and the compressed air path to a first liquid. The heat recovery system includes a first evaporator configured to evaporate the first liquid to a first gas and a first generator configured to produce electricity based on an expansion of the first gas.

In accordance with another embodiment of the invention, a compressed air energy storage (CAES) system includes a compressed air storage volume, a compression train coupled to the compressed air storage volume, a compressed air storage path coupled to the compression train, a primary generator configured to generate electricity based on expansion of compressed air passed from the compressed air storage volume, and a secondary electrical generation system coupled to the compression train. The compression train includes a plurality of compressors in series configured to serially compress ambient air passing therethrough and a compressor path configured to provide passage of air from a first compressor of the plurality of compressors to a last compressor of the plurality of compressors. The compressed air storage path is configured to allow passage of the ambient air compressed by the plurality of compressors to the compressed air storage volume. The secondary electrical generation system includes a first liquid configured to receive a first quantity of heat extracted from compressed air passing through at least one of the compressor path and the compressed air storage path, a first evaporator configured to convey the first quantity of heat to the first liquid and cause the first liquid to evaporate to a first gas, and a first secondary generator configured to generate electricity based on expansion of the first gas.

In accordance with yet another embodiment of the invention, a method of producing energy from a compressed air energy storage (CAES) system that includes conveying a quantity of air through a compression system having an air intake to intake the quantity of air into the compression system, at least two compressors in series configured to compress the quantity air after intake, a compressor path from the first compressor to the second compressor, and a compressed air path configured to provide a path for the quantity of air that is compressed to exit the compression system into a compressed air storage volume. The method further includes generating primary electricity based on expansion of compressed air passed from the compressed air storage volume, transferring a first quantity of heat from the quantity of air passing through one of the compressor path and the compressed air path to a first liquid to aid in an evaporation of the first liquid to a first gas, and generating electricity based on expansion of the first gas through a turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of producing energy from a compressed air energy storage (CAES) system comprising:
   conveying a quantity of air through a compressor path connecting at least two compressors in series and conveying compressed air along a compressed air path into a compressed air storage volume;
   generating primary electricity based on expansion of compressed air passed from the compressed air storage volume; and
   generating electricity using a secondary electrical generation system comprising a first heat transfer path coupled to the compressor path; and a second heat transfer path thermally coupled to the compressed air path; wherein the first heat transfer path is configured to draw heat from both the compressor path and the second heat transfer path; and wherein the first heat transfer path comprises a first liquid and a first energy production unit; and wherein the second heat transfer path comprises a second liquid and a second energy production unit; and wherein the first and second energy production units are configured to generate electricity by evaporating and expanding the first liquid within the first heat transfer path, and the second liquid within the second heat transfer path.

2. The method of claim 1, further comprising:
   conveying the quantity of air from the compressed air path through a thermal energy storage (TES) system such that heat is extracted from the quantity of air and stored in the TES system; and
   conveying the quantity of air from the compressed air storage volume back through the TES system to extract heat from the TES system into the quantity of air conveyed from the compressed air storage volume.

3. A compressed air energy storage (CAES) system comprising:
   a compression train comprising:
      a first compressor configured to compress air;
      a second compressor configured to further compress air; and
      a compressor path configured to provide passage of compressed air from the first compressor to the second compressor;
   a storage volume configured to store compressed air egressing from the compression train;
   a compressed air path coupled to the compression train and the storage volume, the compressed air path configured to provide passage of compressed air egressing from the compression train to the storage volume; and
   a heat recovery system comprising:
      a first heat transfer path coupled to the compressor path; and
      a second heat transfer path thermally coupled to the compressed air path;
   wherein the first heat transfer path is configured to draw heat from both the compressor path and the second heat transfer path; and
   wherein the first heat transfer path comprises a first liquid and a first energy production unit; and
   wherein the second heat transfer path comprises a second liquid and a second energy production unit; and
   wherein the first and second energy production units are configured to generate electricity by evaporating and expanding the first liquid within the first heat transfer path, and the second liquid within the second heat transfer path.

4. The CAES system of claim 3 wherein the heat recovery system comprises an organic Rankine cycle.

5. The CAES system of claim 3 wherein the heat recovery system comprises a Kalina cycle.

6. The CAES system of claim 3 wherein the first liquid comprises one of a butane-type liquid and a refrigerant and the second liquid comprises a pentane-type liquid.

7. The CAES system of claim 3 wherein the heat recovery system is configured to convey heat from a second gas produced by evaporation of the second liquid in an evaporator of the second heat transfer path to the first liquid within the first heat transfer path to evaporate the first liquid to form a first gas in a first evaporator of the first heat transfer path.

8. The CAES system of claim 7 wherein the heat recovery system further comprises a first condenser configured to condense the first gas.

9. The CAES system of claim 3 wherein the CAES system is an adiabatic CAES system and further comprises:
a thermal energy storage (TES) system thermally coupled along the compressed air path proceeding from the compression train to the storage volume, the TES system configured to remove and store heat from air egressing from the compression train.

10. The CAES system of claim 3 wherein the CAES system is a non-adiabatic CAES system.

11. An adiabatic compressed air energy storage (CAES) system comprising:
a compressed air storage volume;
a compression train coupled to the compressed air storage volume, the compression train comprising:
    a plurality of compressors in series configured to serially compress ambient air passing therethrough; and
    a compressor path configured to provide passage of air from a first compressor of the plurality of compressors to a last compressor of the plurality of compressors;
a compressed air path coupled to the compression train and configured to allow passage of the ambient air compressed by the plurality of compressors to the compressed air storage volume;
a thermal energy storage (TES) system coupled to the compressed air path and configured to remove and store heat from compressed air passing through the compressed air path prior to storage of the compressed air in the compressed air storage volume;
a primary energy production system configured to generate electricity based on expansion of compressed air passed from the compressed air storage volume; and
a heat recovery system comprising:
    a first heat transfer path coupled to the compressor path; and
    a second heat transfer path thermally coupled to the compressed air path;
wherein the first heat transfer path is configured to draw heat from both the compressor path and the second heat transfer path; and
wherein the first heat transfer path comprises a first liquid and a first energy production unit; and
wherein the second heat transfer path comprises a second liquid and a second energy production unit; and
wherein the first and second energy production units are configured to generate electricity by evaporating and expanding the first liquid within the first heat transfer path, and the second liquid within the second heat transfer path.

12. The CAES system of claim 11 wherein the second heat transfer path is configured to receive heat from compressed air passing along the compressed air path from the TES system to the compressed air storage volume.

13. The CAES system of claim 11 wherein the second heat transfer path is thermally coupled to the compressed air path such that heat is passed directly from the compressed air path to the second heat transfer path by means of an aftercooler.

14. The CAES system of claim 13 wherein the second heat transfer path is thermally coupled to the compressed air path via an intermediate thermal oil loop.

* * * * *